(12) United States Patent
Enguehard et al.

(10) Patent No.: US 11,025,545 B2
(45) Date of Patent: Jun. 1, 2021

(54) CONDITIONAL COMPOSITION OF SERVERLESS NETWORK FUNCTIONS USING SEGMENT ROUTING

(71) Applicant: Cisco Technology, Inc., San Jose, CA (US)

(72) Inventors: Marcel Enguehard, Paris (FR); Yoann Desmouceaux, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/434,047

(22) Filed: Jun. 6, 2019

(65) Prior Publication Data
US 2020/0389401 A1  Dec. 10, 2020

(51) Int. Cl.
*H04L 12/749* (2013.01)
*H04L 12/741* (2013.01)
*H04L 12/725* (2013.01)

(52) U.S. Cl.
CPC ........ *H04L 45/745* (2013.01); *H04L 45/3065* (2013.01); *H04L 45/741* (2013.01)

(58) Field of Classification Search
None
See application file for complete search history.

(56) References Cited

U.S. PATENT DOCUMENTS

| | | | |
|---|---|---|---|
| 9,825,856 B2 | 11/2017 | Yong et al. | |
| 10,243,922 B2 | 3/2019 | Bifulco et al. | |
| 10,367,737 B1* | 7/2019 | Morris | H04L 45/745 |
| 2017/0237656 A1* | 8/2017 | Gage | H04L 61/2521 370/392 |
| 2017/0331672 A1* | 11/2017 | Fedyk | H04L 45/306 |
| 2018/0091420 A1 | 3/2018 | Drake et al. | |
| 2018/0198705 A1* | 7/2018 | Wang | H04L 12/4633 |
| 2018/0262443 A1* | 9/2018 | Zhang | H04L 47/786 |
| 2018/0375766 A1 | 12/2018 | Filsfils et al. | |
| 2019/0313286 A1* | 10/2019 | Stumpert | H04W 28/10 |
| 2020/0162375 A1* | 5/2020 | Chen | H04L 45/304 |

OTHER PUBLICATIONS

Ahmed Abdelsalam, Stefano Salsano, Francois Clad, Pablo Camarillo, Clarence Filsfils, "SERA: Segment Routhing Aware Firewall for Service Function Chaining Scenarios," Semantic Scholar, 2018, pp. 1-9.

(Continued)

*Primary Examiner* — Ajit Patel
(74) *Attorney, Agent, or Firm* — Patterson + Sheridan, LLP (57) ABSTRACT

Embodiments herein describe branch statements for a segment routing (SR) list that are inserted into a packet header for use when performing Service function chaining (SFC). For example, the branch statement may be embedded within a SR list and includes a serverless function ID and two different segment IDs (SIDs). When reaching a network node assigned to perform the serverless function, the node uses the function ID to determine the appropriate serverless function to use when evaluating the packet and then uses the results of that function to determine which segment to use when forwarding the packet. Thus, rather than forming a linear chain, the branch statement permits the SR list to form different routes (depending on the results of the serverless function) as part of SFC.

20 Claims, 6 Drawing Sheets

(56) References Cited

OTHER PUBLICATIONS

Sapio et al., "In-Network Computation is a Dumb Idea Whose Time Has Come," HotNets-XVI, Nov. 30-Dec. 1, 2017, 7 pages.
Michal Krol and Ioannis Psaras, "NFaaS: Named Function as a Service," ICN '17, Sep. 26-28, 2017, 11 pages.
AbodelSalam et al., "Implementation of Virtual Network Function Chaining through Segment Routing in a Linux-based Infrastrure," arXiv:1702.05157v4 [cs.NI] Apr. 20, 2017, 10 pages.
Xhonneux, Mathieu, Fabien Duchene, and Olivier Bonaventure. "Leveraging eBPF for programmable network functions with IPv6 Segment Routing." Proceedings of the 14th International Conference on emerging Networking EXperiments and Technologies. ACM, 2018.

\* cited by examiner

CONDITIONAL COMPOSITION OF SERVERLESS NETWORK FUNCTIONS USING SEGMENT ROUTING

TECHNICAL FIELD

Embodiments presented in this disclosure generally relate to inserting branch statements when performing segment routing as part of service function chaining.

BACKGROUND

Service function chaining (SFC), also known as network service chaining, uses software-defined networking (SDN) capabilities to create a service chain of connected network services (such as firewalls, network address translation (NAT), intrusion protection) and connects them in a virtual chain. SFC can be used by network operators to set up suites or catalogs of connected services that enable the use of a single network connection for many services, with different characteristics.

One advantage of SFC is automating the way virtual network connections can be set up to handle traffic flows for connected services. For example, an SDN controller could take a chain of services and apply them to different traffic flows depending on the source, destination, or type of traffic (e.g., a traffic class). Some examples include routing packets received from a particular source through a firewall or using a video encoder/decoder to process a packet with video data in its payload. However, once a list of segment routes is identified and applied to the packet, SFC uses a linear chain to route a packet through the virtual chain of services identified by the segment routes. This limits the flexibility of segment routing and SFC.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes receiving a packet at an ingress node and inserting a branch statement into an internet protocol (IP) address header of the packet where the branch statement comprises a function ID for a serverless function, a first SID indicating a first segment for routing the packet when the serverless function generates a first result, and a second SID indicating a second segment for routing the packet when the serverless function generates a second result. The method also includes forwarding the packet to perform service function chaining (SFC) based on the branch statement.

Another embodiment presented herein is a network device that includes a processor configured to receive a packet at an ingress node and insert a branch statement into an IP address header of the packet where the branch statement comprises a function ID for a serverless function, a first SID indicating a first segment for routing the packet when the serverless function generates a first result, and a second SID indicating a second segment for routing the packet when the serverless function generates a second result. The processor is also configured to forward the packet to perform SFC based on the branch statement.

Another embodiment presented herein is an IP packet stored in non-transitory computer readable medium wherein the IP packet includes an address header that includes a plurality of segments configured to route the packet when performing SFC and a branch statement comprises a function ID for a serverless function, a first SID indicating a first segment for routing the packet when the serverless function generates a first result, and a second SID indicating a second segment for routing the packet when the serverless function generates a second result.

Example Embodiments

Embodiments herein describe branch statements for a segment routing (SR) list that are inserted into a packet header for use when performing SFC. For example, the branch statement may be embedded within a SR list and includes a serverless function ID and two different segment IDs (SIDs). When reaching a network node assigned to perform the serverless function, the node uses the function ID to determine the appropriate serverless function to use when evaluating the packet and then uses the results of that function to determine which segment to use when forwarding the packet. For example, if the serverless function outputs TRUE (or "1"), the network node forwards the packet using the first SID in the branch statement, but if the result is FALSE (or "0"), the node forwards the packet using the second SID in the branch statement. Thus, rather than forming a linear chain, the branch statement permits the SR list to form different routes (depending on the results of the serverless function) as part of SFC.

In one embodiment, the serverless function is a function that does not save state. These serverless functions (e.g., stateless network functions or lambda functions) can be spawned (or spun) up at different nodes in a network so long as the nodes have sufficient compute resources and availability. Because the serverless functions are stateless, the network can have multiple instances of the same function operating on different nodes without being synchronized. These serverless functions can then be executed as part of the branch statements described above.

Figure 1:
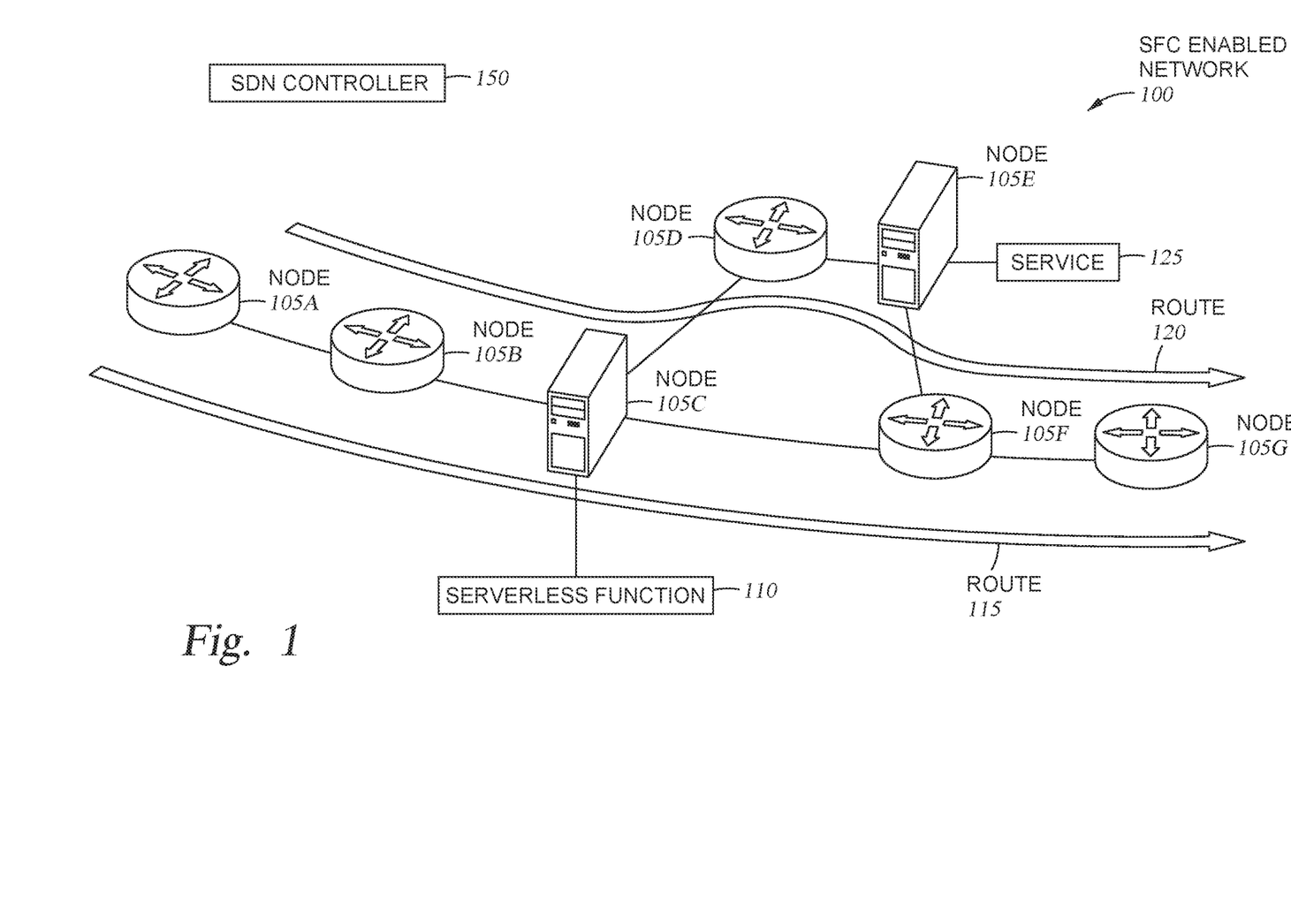
FIG. 1 illustrates a network that uses branch statements when performing SFC, according to one embodiment described herein.

FIG. 1 illustrates a network 100 that uses branch statements when performing SFC, according to one embodiment described herein. The SFC enabled network 100 includes a plurality of interconnected nodes 105 that enable packets to be routed through the network 100. In this example, packets are received at an ingress node 105A and exit at an egress node 105G. In one embodiment, the nodes 105 perform various functions or services at each segment (e.g., each hop between the nodes).

The network 100 also includes a SDN controller 150 which can establish segment routing in the network 100. In one embodiment, the SDN controller 150 provides rules to the ingress node 105A which it uses to assign a SR list to packets. As described in more detail below, the ingress node 105A evaluates the received packets, and based on information in the packet, determines the appropriate SR list to insert into a header of the packet. The SR list includes a plurality of segments that a packet traverses in the network 100 as part of SFC.

For clarity, FIG. 1 illustrates that each packet is assigned the same SR list, which has a branch statement. For example, using the SR list, the node 105A routes the packets to the node 105B which then routes the packets to the node 105C. As shown, the node 105C hosts a serverless function 110 which it performs on the packets as part of SFC. For example, the SFC performed by the network 100 may be part of security process that packets must pass before being allowed to enter another network (e.g., a data center, local access network, etc.). The branch statement permits the network 100 to handle conditionality such as "forward a packet to node X when Y is true; otherwise, forward the packet to node Y." The serverless function 110 permits the node 105C to determine whether the condition is satisfied or not, which then affects the remaining path of the packet. For example, the serverless function 110 may determine whether the packet is from a particular source (e.g., a non-trusted source) or stores a type of data in the payload that requires special processing.

FIG. 1 illustrates two routes that correspond to the same SR list. The route 120 corresponds to when the serverless function 110 determines the condition is true and the packet is routed to the node 105D, while route 115 illustrates when the serverless function 110 determines the condition is false and the packet is routed to the node 105F. In this example, the route 115 bypasses the processing steps performed by the nodes 105D and node 105E in the route 120. For example, the node 105E hosts a service 125 which may be a firewall that is used only if the packet is received from a non-trusted source, or a video encoder/decoder used only when the packet has video data in its payload. Thus, packets that do not meet the condition tested by the serverless function 110 bypass the nodes 105D and 105E which mean the service 125 is not performed. Of course, these are just a few examples of when branch statements in a SR list could be helpful. In other examples, branch statements could be used when deciding whether to perform load balancing, route traffic through more (or less) intensive intrusion protection, and the like.

The serverless function 110 is a stateless function. For example, the same instances of the serverless function 110 can be executed in different compute systems (or network nodes) without the functions needing to be synchronized. Examples of serverless functions (also referred to as lambda functions) include rule based functions which result in a condition being true or false. However, other types of serverless functions are mathematical functions (such as x++ or x−−). In contrast, other services or functions in the chain may be stateful functions. For example, the service 125 performed on the node 105E may be a NAT service which has a state.

The network nodes 105 in the network 100 can be routers, switches, or servers. In other examples, the nodes 105 may be virtual switches, virtual routers, or virtual machines that are hosted on one or more compute devices. In one embodiment, any network node 105 that has a processor can be used to host the serverless function 110. That is, while FIG. 1 illustrates hosting the serverless function 110 on the node 105C (e.g., a server), the function 110 could instead be hosted on a switch.

Figure 2:
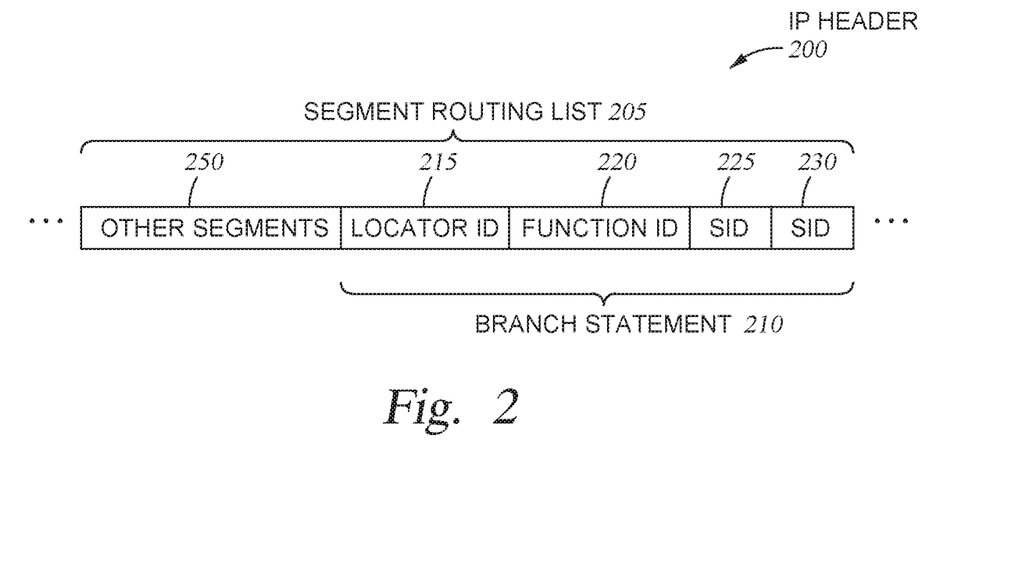
FIG. 2 illustrates an IP header that includes a segment routing list with an embedded branch statement, according to one embodiment described herein.

FIG. 2 illustrates an IP header 200 that includes a SR list 205 with an embedded branch statement 210, according to one embodiment described herein. As discussed below, SR list 205 is inserted into the IP header 200 of a packet as part of performing SR. The SR list 205 defines a plurality of segments 250 which establish a chain of services or functions that are part of SFC. In one embodiment, as the packet with the IP header 200 proceeds through the chain, the receiving nodes read the segments 250 in a predefined order so that the packet proceeds in a desired manner through the chain.

However, the SR list 205 also includes a branch statement 210 that changes the chain from a linear chain to a branching chain. As a result, the packet can proceed along two different routes as illustrated in FIG. 1. In one embodiment, the SR list 205 is disposed in an IPv6 IP header 200. For example, the IPv6 header may include a source address and a destination address. In one embodiment, a portion of the data in the header is replaced to include the SR list 205 which identifies a plurality of segments 250 through which the packet traverses. For example, the SR list 205 may replace some or all of the destination address in the header 200.

In one embodiment, each of the segments 250 includes a location ID and a service ID that identifies the next hop in the chain and what service or function that network node should perform. For example, a first segment 250 may instruct Network Node A to perform a NAT, a second segment 250 may instruct Network Node B to run the packet through a firewall, and a third segment 250 may instruct Network Node C to perform load balancing.

In addition to the segments 250, the SR list 205 includes the branch statement 210 which has a locator ID 215, a function ID 220, a first SID 225, and a second SID 230. The locator ID 215 identifies a node that is assigned to perform a serverless function that corresponds to the function ID 220. As discussed in detail below, the locator ID 215 may identify a specific network node that should receive the packet, but in other embodiments, may identify a type of network node, or a group of network nodes, that should receive the packet and perform the serverless function. In one embodiment, the locator ID 215 can be omitted and instead the function ID 220 can be used to route the packet to the next node in the chain.

In one embodiment, the locator ID 215 is a 64 bit routable prefix, the function ID 220 is a six byte function identifier, and the first SID 225 and second SID 230 are one-byte SID identifiers. However, these are just examples of the amount of bits that can be used for defining the various elements in the branch statement 210. The branch statement 210 can be assigned more (or fewer) bits in the IP header 200 and the assignment of those bits may be divided differently among the location ID 215, the function ID 220, and the first and second SIDs 225, 230. Further, the branch statement 210 could be used with severless functions that return more than two results (e.g., three or four results). In that case, the branch statement 210 has three or four SIDs that correspond to the number of possible results of the severless function. As such, the embodiments herein are not limited to branch statements with two possible paths, but could include any number of different paths that result from performing a severless function.

Figure 3:
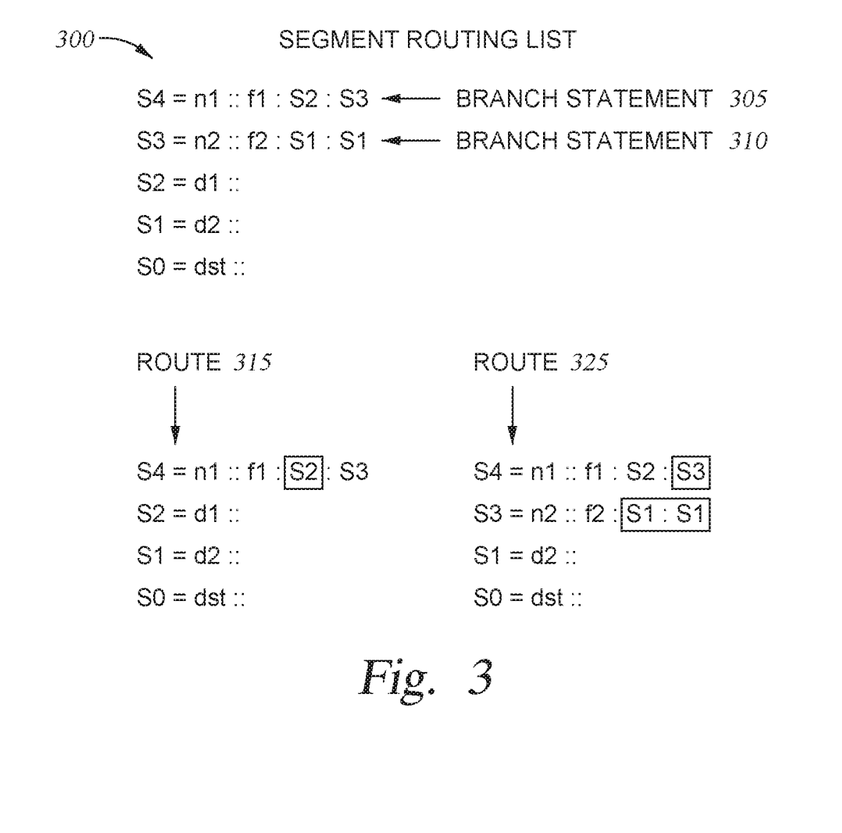
FIG. 3 illustrates a segment routing list with multiple segments and branch statements, according to one embodiment described herein.

FIG. 3 illustrates a SR list 300 with multiple segments and branch statements, according to one embodiment described herein. The SR list 300 includes branch statement 305 and branch statement 310. The remaining segments—i.e., Segments S0-S2—do not contain branching conditions. The branch statement 305 determines which of the remaining segments in the SR list 300 are followed and which are not. Assuming the Segment S4 is performed first, the branch statement 305 indicates that a Node n1 performs the Serverless Function f1 on the packet. If the result of the Function f1 is a first result (e.g., TRUE), the next hop in the chain is to the Segment S2. However, if the output of the Function F1 is a second result (e.g., FALSE), the next hop in the chain is to the Segment S3.

Route 315 illustrates the chain the packet follows if the result of the Serverless Function f1 is the first result, while route 325 illustrates the chain the packet follows when the result of the Serverless Function f1 is the second result. In the route 315, the result of the Serverless Function f1 indicates that the Segment S2 is the next hop in the chain. As such, the packet then proceeds to the Destination d1 corresponding to the Segment S2 where the corresponding node performs a first service. The packet is then routed according to the SR list 300 to the Destination d2 corresponding to the Segment S1. Again, the node corresponding to the Destination d2 can perform a second service. Finally, the packet is routed to the Destination dst corresponding to the Segment S0 where the service chain is complete.

Route 325, in contrast, illustrates the chain the packet takes when the Serverless Function f1 generates the second result. Instead of using Segment S2, the packet is routed using Segment S3 which executes another Serverless Function f2 on the Node n1. However, unlike the branch statement 305, the branch statement 310 uses Segment S1 to route the packet regardless of the outcome of the Function f2. Thus, once the Function f2 is complete, the packet is routed to the Destination d2 corresponding to the Segment S1 where the second service is performed. The packet is then routed to the final Destination dst according to the Segment S0.

As shown in FIG. 3, a packet routed along the route 315 (when the Serverless Function f1 has a first result) is routed according to the Segments S4, S2, S1, and S0 but a packet routed along the route 325 is routed according to the Segments S4, S3, S1, and S0.

Figure 4:
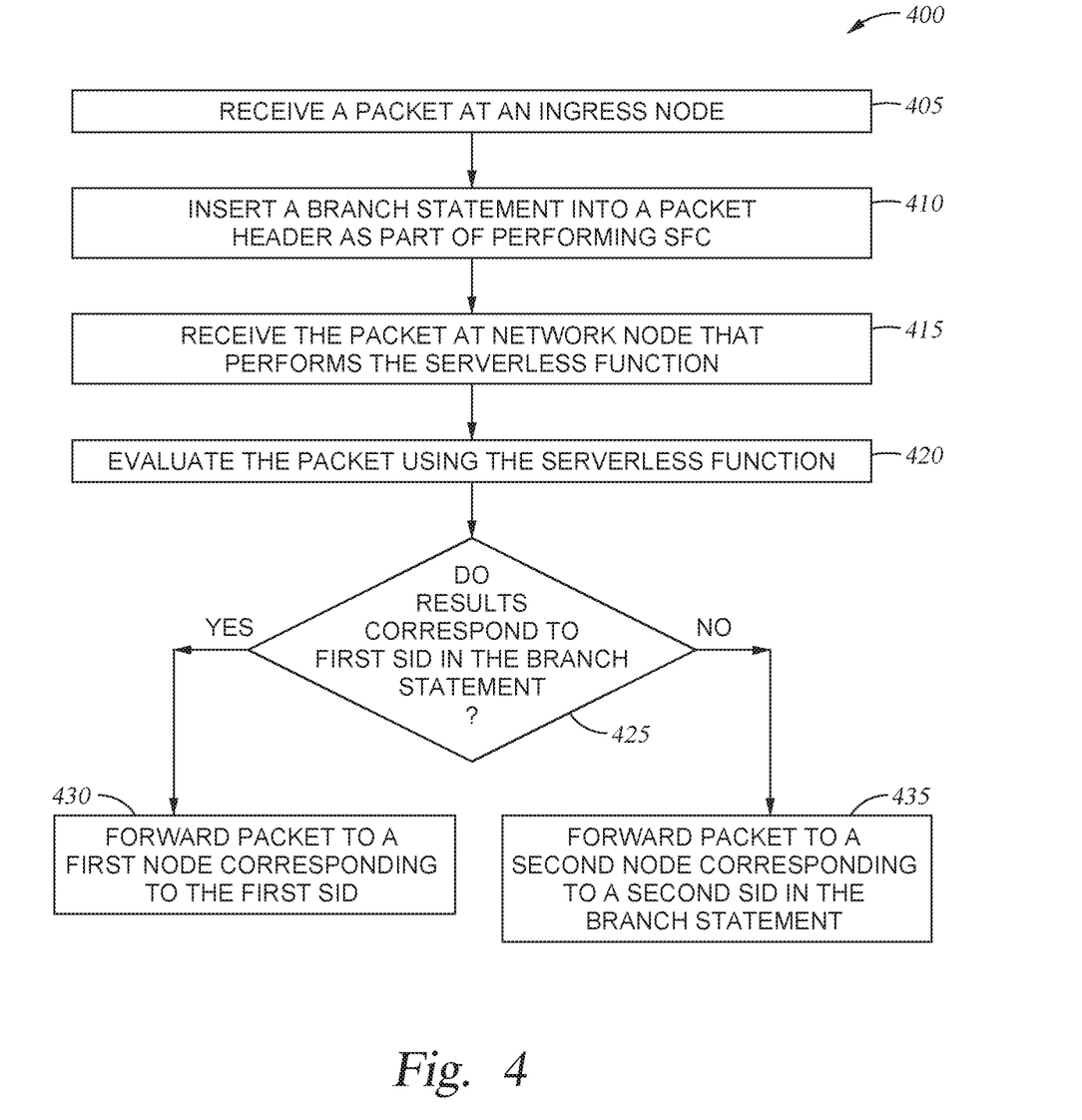
FIG. 4 is a flowchart for routing a packet that includes a branch statement in a segment routing list, according to one embodiment described herein.

FIG. 4 is a flowchart of a method 400 for routing a packet that includes a branch statement in a segment routing list, according to one embodiment described herein. At block 405, an ingress switch in a SFC enabled network receives a packet. In one example, the ingress switch is a part of an intrusion protection SFC for a network or data center. In another example, the ingress switch is part of a network that performs pre-processing on the data in the packet such as load balance, encoding/decoding activities, or the like.

At block 410, the ingress switch inserts a branch statement into a packet header as part of performing SFC. In one embodiment, the branch statement is inserted into an IPv6 header and can replace some of the address information in the header (e.g., a destination or source address). In one embodiment, the branch statement is part of a SR list that may include a plurality of segments in a defined order.

The branch statement includes a function ID and first and second SIDs which indicate segments to be used to route the packet depending on the result of performing the function ID. The branch statement can also include a locator ID for identifying which network node should execute the function ID, but this is not a requirement.

At block 415, the packet is received at a network node that performs the serverless function. This node can be identified by the locator ID or the function ID in the branch statement. Further, the network node can be a different node in the network or can be the ingress node itself. That is, the same node that inserted the branch statement into the packet header can also execute the serverless function.

At block 420, the network node evaluates the packet using the serverless function. For example, the serverless function may be a Boolean function that results in a true/false output. The function may determine whether some data in the payload of the packet is within a certain range or has a specific value. Further, the serverless function may determine if the packet is a certain type or is associated with a particular source/destination address or application. As an example, the serverless function may determine verify whether a packet is destined to a certain IP address and matches a given complicated regex. To perform this function without the use of the branch statement, a SDN architecture would require setting up a rule to redirect all traffic to a node implementing the function, instructing that node to mark the packets in a recognizable way if the function returns successfully, and setting up another rule to redirect all traffic containing that specific mark to a node implementing a different service.

At block 425, the network node determines whether the results correspond to the first SID in the branch statement or the second SID. That is, the first SID may be used if the result of the serverless function is a first value but the second SID is used if the result of the serverless function is the opposite value (or any other value). If the result corresponds to the first SID in the branch statement, the method 400 proceeds to block 430 where the network node forwards the packet to a first node corresponding to the first SID. If not, the method 400 proceeds to block 435 where the network node forwards the packet to a second node corresponding to the second SID.

Figure 5:
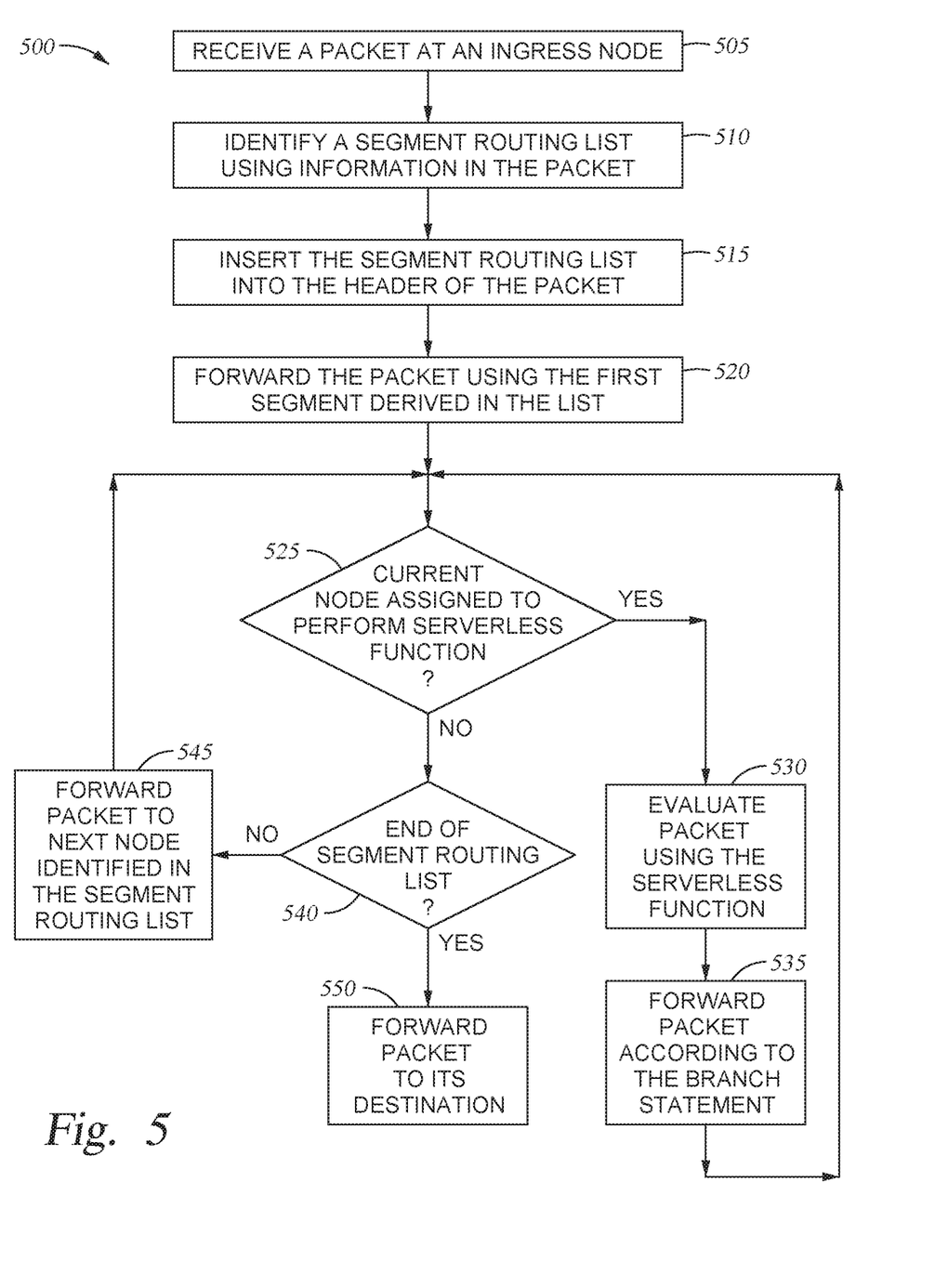
FIG. 5 is a flowchart for routing a packet that includes a branch statement in a segment routing list, according to one embodiment described herein.

FIG. 5 is a flowchart of a method 500 for routing a packet that includes a branch statement in a SR list, according to one embodiment described herein. At block 505, an ingress switch receives a packet that is to be processed using SFC. The SFC may be performed for any of the reasons discussed above (or for any other reason).

At block 510, the ingress switch identifies a SR list using information in the packet. For example, a SDN controller may provide the ingress switch with different SR lists that are to be used depending on the type of the packet. In one embodiment, the ingress switch evaluates whether the packet is a Transmission Control Protocol (TCP) packet or a User Datagram Protocol (UDP) packet. The ingress switch may also evaluate the source/destination addresses and the source/destination ports to classify the packet. The SDN controller may provide different SR lists to the ingress switch for the different types of packets.

In one embodiment, the ingress switch assigns the packet to a particular class of traffic. Using this assignment, the ingress switch selects a particular SR list corresponding to the class. Thus, each class can have a different chain it uses when performing SFC. In any case, the SR lists provided by the SDN controller can have any number of branch statements within them. For example, some of the SR lists may have no branch statements while other SR lists may have one, two, or three branch statements.

At block 515, the ingress switch inserts the identified SR list into the header of the packet. As illustrated in FIG. 2, the header can include multiple segments along with a branch statement. The packet may traverse the segments before or after the branch statement is reached in the list. However, in other embodiments, the SR list may include only a branch statement.

At block 520, the ingress switch forwards the packet using the first segment defined in the SR list. That is, the segments in the SR list may be arranged in a predefined order such that the packet traverses the chain in a predefined manner (until reaching a branch statement). In one embodiment, the network node tracks a next segment in to the SR list using a "SegmentsLeft" pointer in the SRv6 header to determine where to route the packet to next. The ingress switch can modify the destination address of the packet so that the packet is routed according to the next segment in the SR list.

At block 525, the network node that received the packet from the upstream node (e.g., the ingress switch) determines whether it is assigned to perform a serverless function. If so, the method 500 proceeds to block 530 where the network node evaluates the packet using the serverless function. If the serverless function returns successfully (e.g., provides a first result), the network node modifies the destination address of the packet and changes the SegmentsLeft pointer to the first SID in the branch statement. If not, the network node modifies the destination address of the packet and changes the SegmentsLeft pointer to the second SID in the branch statement.

At block 530, the network node forwards the packet according to the branch statement (e.g., depending on which of the SIDs was used to determine the next destination for the packet in the chain). The method 500 then returns to the block 525 to determine whether the current node should perform a serverless function corresponding to a branch statement.

However, assuming that the current network node does not perform a serverless function, the method 500 proceeds to block 540 where the node determines whether it is at the end of the SR list. Moreover, the current node may perform a stateful function on the packet such as a NAT operation or a firewall application.

If the node is part of the last segment, at block 550, the network node forwards the packet to its destination. Otherwise, the method 500 proceeds to block 545 where the node forwards the packet to the next node identified in the SR list and the method returns to block 525. Thus, the blocks 525-545 can repeat to process the packet in a chain that include any number of serverless functions and stateful functions that can be performed by any number of network nodes.

Figure 6:
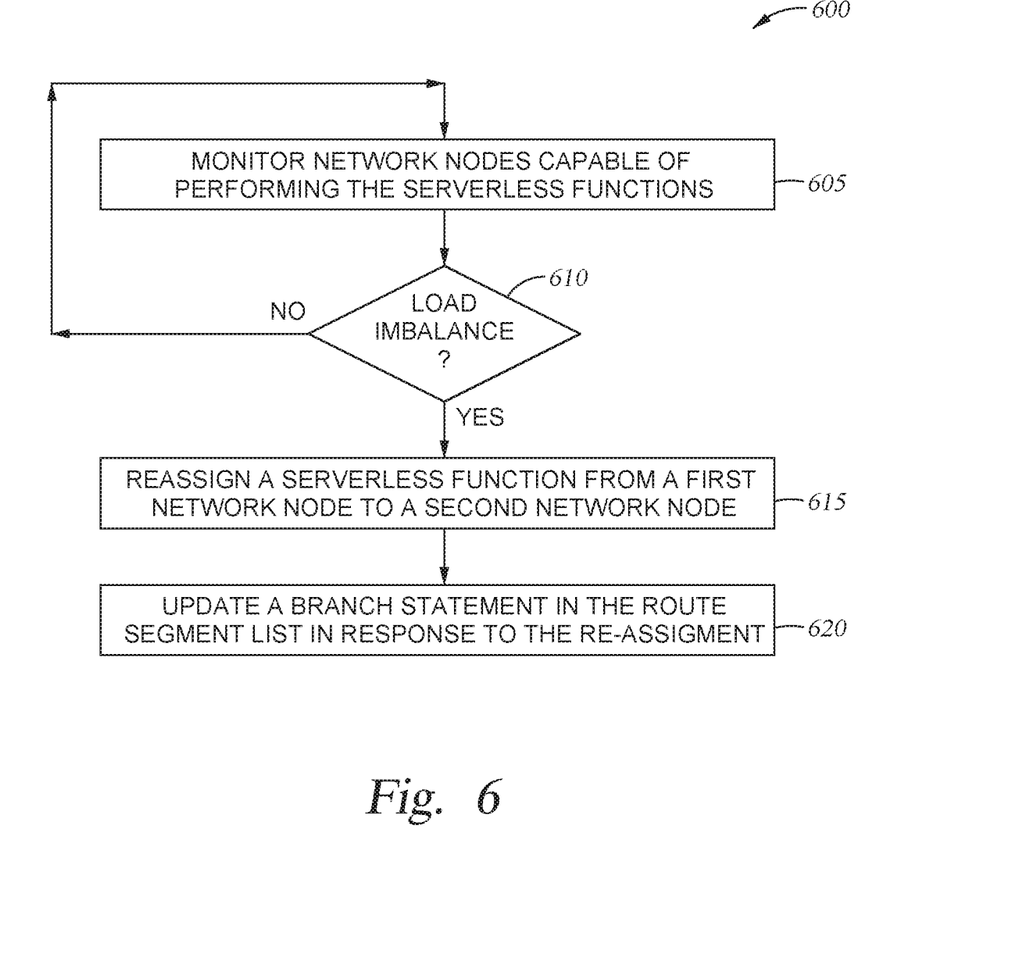
FIG. 6 is a flowchart for assigning serverless functions to network nodes using a push model, according to one embodiment described herein.

FIG. 6 is a flowchart of a method 600 for assigning serverless functions to network nodes using a push model, according to one embodiment described herein. For example, the method 600 may be used in conjunction with a centralized repository that stores multiple serverless functions that may be used in the SR lists managed by a SDN controller. Using method 600, the SDN controller can distribute or assign the serverless node to be executed on a particular network node.

At block 605, the SDN controller monitors networks node capable of performing the serverless function. In one embodiment, the SDN controller has a list of the network nodes with the requisite compute functionality to execute the serverless functions. For example, some network nodes may be unable to execute serverless functions. Further, some network nodes can execute some serverless functions but not others.

In one embodiment, the SDN controller monitors performance metrics corresponding to the network nodes such as load, CPU/memory utilization, available compute, and the like. By comparing these metrics, the SDN controller can identify network nodes that are underutilized and overutilized.

At block 610, the SDN controller determines whether there is a load imbalance issue among the network nodes being monitored at block 605. For example, one network node may be running at 90% utilization while another node has 30% utilization, which indicates a load balance issue in the network.

Assuming there is no load balance issue, the method 600 returns to block 605 which is repeated along with block 610 until a load balance issue is detected. Once detected, the method 600 proceeds to block 615 where the SDN controller reassigns a serverless function from a first network node (e.g., the over-utilized node) to a second network node (e.g., the underutilized node). Doing so may reduce the utilization of the first node which may improve the overall performance of the network. For example, due to the high utilization, the first network node may take longer to perform the serverless functions. By moving one or more serverless functions to the second node, the overall latency of the network (or the time used by a packet to traverse the chain) may be reduced.

In one embodiment, the SDN controller pushes the reassigned serverless function to the second network node. For example, the SDN controller may instruct the second network node to retrieve the serverless function from the central repository. Moreover, the SDN controller can instruct the first network node that is no longer needs to store the serverless function in its memory. Further, while the method 600 describes reassigning a single serverless function, the SDN controller can reassign many different serverless functions to many different network nodes.

In one embodiment, rather than using the SDN controller to update the locations of the serverless functions, a decentralized routing protocol can be used such as Border Gateway Protocol (BGP), Open Shortest Path First (OSPF), or Intermediate System to Intermediate System (ISIS) routing. In yet another embodiment, a mobility management protocol such as a Locator/ID Separation Protocol (LISP) can be used by endpoint identified (EID) to routing locator (RLOC) mappings to the local LISP map resolver.

At block 620, the SDN controller updates a branch statement in the SR list corresponding to the serverless function in response to the reassignment. One or more SR lists used by the network may include a branch statement with a function ID corresponding to the reassigned serverless function. These branch statements may include a locator ID that pointed to the first network node. The SDN controller can update these branch statements so that the locator ID now points to the second node and provide the updated SR lists to the ingress switch (or switches) in the network. Thus, anytime a SR list is inserted into the packet, the locator ID points to the second network node which is currently tasked with executing the serverless function.

Figure 7:
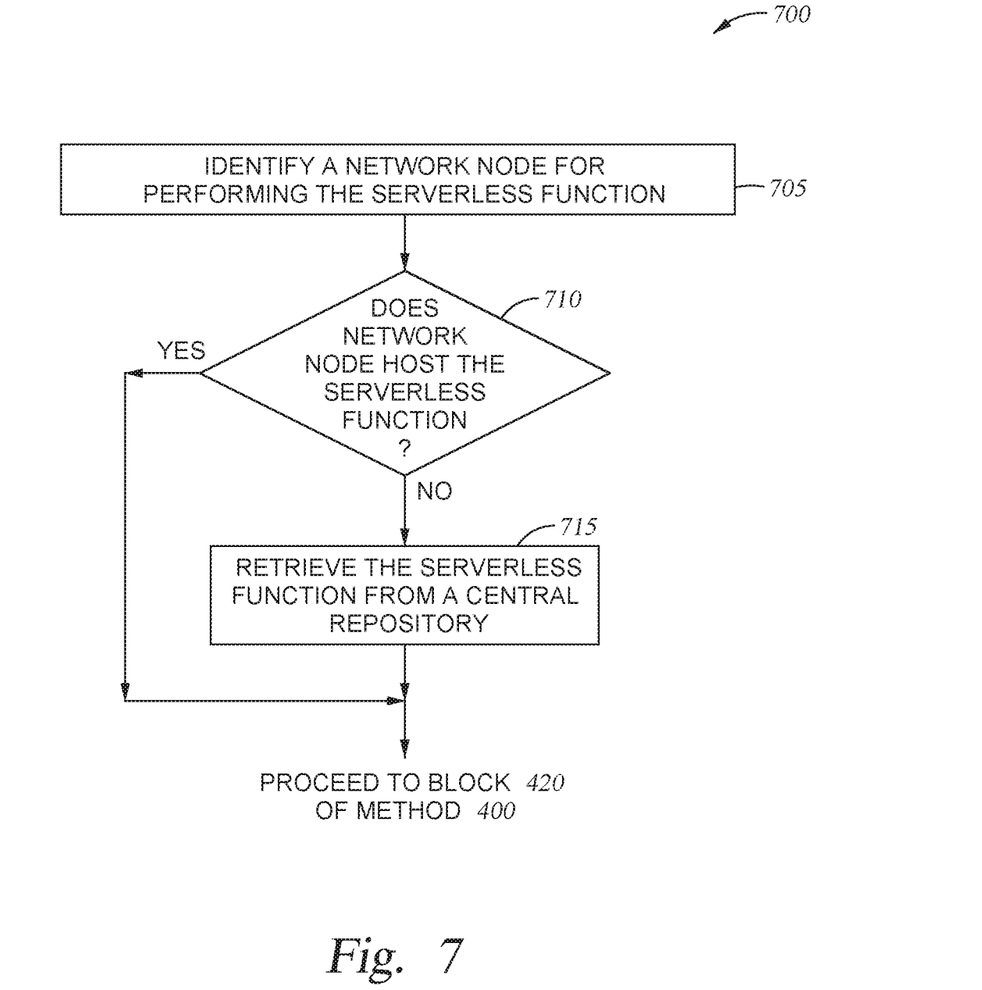
FIG. 7 is a flowchart for assigning serverless functions to network nodes using a pull model, according to one embodiment described herein.

FIG. 7 is a flowchart of a method 700 for assigning serverless functions to network nodes using a pull model, according to one embodiment described herein. Rather than using a push model to control which network node executes a serverless function, the method 700 describes various techniques for using a pull model to execute the serverless functions.

At block 705, a forwarding plane in the network identifies a network node for performing the serverless function identified in the branch statement. In one embodiment, the locator ID in the branch statement may not point to a specific node. Rather, the locator ID can be an anycast address indicating any node which is capable of executing the serverless function. That is, the forwarding network node may not know what network node has the capabilities for executing the serverless function. Using the anycast address, the forwarding plane determines which network node receives the packet and then, at block 710, that network node can pull the serverless function from a central repository.

Alternatively, the branch statement may not include a locator ID. Instead, the forwarding plane uses the function ID to route the packet to a network node for performing the serverless function. In one embodiment, the forwarding plane may use Information Centric Networking (ICN) to forward the packet using the function ID. In that case, the network routes the packet towards an object (e.g., a service such as a serverless function) rather than an address.

At block 710, the network node that receives the packet determines whether it has the serverless function. If so, the method 700 can proceed to block 420 of the method 400 where the network node evaluates the packet using the serverless function. If not, the method 700 proceeds to block 715 where the network node retrieves (or pulls) the serverless function from a central repository.

While the pull model in method 700 provides the advantage of being able to deploy the serverless functions on a need basis in contrast to the method 600 where the functions are pre-deployed, the method 700 has a disadvantage of waiting until the serverless function can be retrieved (or pulled) from the central repository if the serverless function has not previously been retrieved from the repository.

In another embodiment, the branch statement may have a generic locator ID (similar to an anycast address) which is used to transmit the packet in the network. However, the network nodes may advertise to the network fabric that it has already retrieved a serverless function from the central repository. Thus, while the locator ID is generic, the network nodes can inform the network which serverless function (or functions) they have already retrieved and are ready to execute. Thus, the network nodes that have already downloaded a serverless function can be prioritized by the forwarding plane so that when a branch statement having that generic locator ID is reached, the function ID can be used by the forwarding plane to intelligently determine which network node should receive the packet, and thus, avoid the latency involved with pulling the serverless function from the central repository.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving a packet at an ingress node;
   inserting a branch statement into an internet protocol (IP) address header of the packet, wherein the branch statement comprises a function ID for a serverless function, a first segment identifier (SID) indicating a first segment for routing the packet when the serverless function generates a first result, and a second SID indicating a second segment for routing the packet when the serverless function generates a second result; and
   forwarding the packet to perform service function chaining (SFC) based on the branch statement.

2. The method of claim 1, wherein forwarding the packet comprises:
   forwarding the packet to a second node;
   evaluating the packet by performing the serverless function on the second node; and
   upon determining the serverless function generates the first result, forwarding the packet to a destination corresponding to the first SID, and not forwarding the packet to a destination corresponding to the second SID.

3. The method of claim 1, wherein the branch statement further comprises a location ID indicating a destination of a network node to which the packet is forwarded.

4. The method of claim 1, wherein inserting the branch statement comprises:
   inserting the branch statement in an IPv6 address header using a segment router (SR) extension.

5. The method of claim 4, wherein the SR extension is compatible with IPv6 Segment Routing (SRv6).

6. The method of claim 1, wherein the serverless function comprises a lambda function.

7. The method of claim 1, wherein the serverless function is a function that does not store a state.

8. A network device, comprising:
   a processor configured to:
      receive a packet at an ingress node;
      insert a branch statement into an internet protocol (IP) address header of the packet, wherein the branch statement comprises a function ID for a serverless function, a first segment identifier (SID) indicating a first segment for routing the packet when the serverless function generates a first result, and a second SID indicating a second segment for routing the packet when the serverless function generates a second result; and
      forward the packet to perform service function chaining (SFC) based on the branch statement.

9. The network device of claim 8, wherein forwarding the packet comprises:
   forwarding the packet to a second network device, wherein the second network device is configured to evaluate the packet by performing the serverless function on the second network device and, upon determining the serverless function generates the first result, forward the packet to a destination corresponding to the first SID, and not forwarding the packet to a destination corresponding to the second SID.

10. The network device of claim 8, wherein the branch statement further comprises a location indicating a destination of a network node to which the packet is forwarded.

11. The network device of claim 8, wherein inserting the branch statement comprises:
   inserting the branch statement in an IPv6 address header using a segment router (SR) extension.

12. The network device of claim 11, wherein the SR extension is compatible with IPv6 Segment Routing (SRv6).

13. The network device of claim 8, wherein the serverless function comprises a lambda function.

14. The network device of claim 8, wherein the serverless function is a function that does not store a state.

15. A computing device, comprising:
   a processor configured to:
      provide a packet comprising an address header that includes a plurality of segments, wherein the plurality of segments are configured to route the packet when performing service function chaining (SFC), and
      insert a branch statement into the address header of the packet, wherein the branch statement comprises a function ID for a serverless function, a first segment identifier (SID) indicating a first segment for routing the packet when the serverless function generates a first result, and a second SID indicating a second segment for routing the packet when the serverless function generates a second result.

16. The computing device of claim 15, wherein the first SID and the second SID follow the function ID in the address header.

17. The computing device of claim 15, wherein the branch statement further comprises a location indicating a destination of a network node to which the packet is forwarded that performs the serverless function.

18. The computing device of claim 15, wherein the address header is a IPv6 address header compatible with SR extension.

19. The computing device of claim 18, wherein the SR extension is compatible with IPv6 Segment Routing (SRv6).

20. The computing device of claim 15, wherein the serverless function comprises a lambda function.

* * * * *

UNITED STATES PATENT AND TRADEMARK OFFICE
CERTIFICATE OF CORRECTION

| | |
|---|---|
| PATENT NO. | : 11,025,545 B2 |
| APPLICATION NO. | : 16/434047 |
| DATED | : June 1, 2021 |
| INVENTOR(S) | : Marcel Enguehard et al. |

It is certified that error appears in the above-identified patent and that said Letters Patent is hereby corrected as shown below:

On the Title Page

In item (56), in Column 2, under "Other Publications", Line 2, delete "Routhing" and insert -- Routing --, therefor.

On the page 2, in item (56), in Column 1, under "Other Publications", Line 6, delete "Infrastrure,"" and insert -- Infrastructure," --, therefor.

In the Specification

In Column 5, Line 5, delete "severless" and insert -- serverless --, therefor.

In Column 5, Line 8, delete "severless" and insert -- serverless --, therefor.

In Column 5, Line 12, delete "severless" and insert -- serverless --, therefor.

Signed and Sealed this
Tenth Day of January, 2023

Katherine Kelly Vidal
*Director of the United States Patent and Trademark Office*